United States Patent
Suzuka

(10) Patent No.: US 9,563,066 B2
(45) Date of Patent: Feb. 7, 2017

(54) POSITION CONTROLLER FOR OPTICAL ELEMENT

(75) Inventor: Shinya Suzuka, Saitama (JP)

(73) Assignee: HOYA CORPORATION, Tokyo (JP)

( * ) Notice: Subject to any disclaimer, the term of this patent is extended or adjusted under 35 U.S.C. 154(b) by 875 days.

(21) Appl. No.: 13/372,955

(22) Filed: Feb. 14, 2012

(65) Prior Publication Data

US 2012/0218429 A1  Aug. 30, 2012

(30) Foreign Application Priority Data

Feb. 28, 2011 (JP) ................................. 2011-042027
Mar. 31, 2011 (JP) ................................. 2011-076925

(51) Int. Cl.
*H04N 5/228* (2006.01)
*G02B 27/64* (2006.01)

(52) U.S. Cl.
CPC ..... *G02B 27/646* (2013.01); *G03B 2205/0015* (2013.01); *G03B 2205/0092* (2013.01)

(58) Field of Classification Search
USPC .................................................. 348/208.11
See application file for complete search history.

(56) References Cited

U.S. PATENT DOCUMENTS

| 7,515,182 | B2 | 4/2009 | Omiya et al. | |
|---|---|---|---|---|
| 8,090,249 | B2 | 1/2012 | Suzuka | |
| 8,121,467 | B2 | 2/2012 | Suzuka | |
| 2007/0183764 | A1* | 8/2007 | Imura et al. | ..................... 396/55 |
| 2009/0195890 | A1* | 8/2009 | Miyamoto | .................... 359/700 |

FOREIGN PATENT DOCUMENTS

| JP | 2005-115316 | 4/2005 |
|---|---|---|
| JP | 2006-058455 | 3/2006 |
| JP | 2007-101993 | 4/2007 |
| JP | 2007-163961 | 6/2007 |
| JP | 2007-206210 | 8/2007 |

(Continued)

OTHER PUBLICATIONS

U.S. Appl. No. 13/352,564 to Shinya Suzuka, filed Jan. 18, 2012.
(Continued)

*Primary Examiner* — Antoinette Spinks
(74) *Attorney, Agent, or Firm* — Greenblum & Bernstein, P.L.C.

(57) ABSTRACT

A position controller for an optical element includes an advancing/retracting member, an anti-shake moving member, an insertable/removable moving member holding the optical element and supported by the anti-shake moving member to move between insertion and removed positions, an insertion holder holding the insertable/removable moving member in the insertion position in the ready-to-photograph state, a removal drive member supported by the advancing/retracting member between a position allowing the anti-shake moving member to move in a moving range and a forced removing position to move the insertable/removable moving member to the removed position, and an insertion/removal controller which holds the removal drive member in the insertion allowance position in the ready-to-photograph state and moves the removal drive member to the forced removing position in the accommodated state.

12 Claims, 14 Drawing Sheets

(56) References Cited

FOREIGN PATENT DOCUMENTS

JP          2008-170650          7/2008

OTHER PUBLICATIONS

U.S. Appl. No. 13/372,938 to Shinya Suzuka, filed Feb. 14, 2012.
U.S. Appl. No. 13/372,969 to Shinya Suzuka, filed Feb. 14, 2012.
U.S. Appl. No. 13/372.987 to Shinya Suzuka, filed Feb. 14, 2012.
U.S. Appl. No. 13/402,065 to Shinya Suzuka, filed Feb. 22, 2012.
U.S. Appl. No. 13/402,072 to Shinya Suzuka, filed Feb. 22, 2012.
Japan Office action, dated Nov. 4, 2014 along with an English translation thereof.

* cited by examiner

POSITION CONTROLLER FOR OPTICAL ELEMENT

BACKGROUND OF THE INVENTION

1. Field of the Invention

The present invention relates to a position controller for an optical element which can be moved to correct image shake and also moved onto and removed from an optical axis of the optical system.

2. Description of the Related Art

There has been an increasing number of optical devices such as cameras which are equipped with an anti-shake mechanism (image shake correcting mechanism/image stabilizing mechanism) that moves a specific optical element such as a lens element or an image sensor (image pickup device) in a plane orthogonal to an optical axis of an optical system to reduce (correct) image shake. In Japanese Unexamined Patent Publication 2007-163961, a technique for removing (radially retracting) an image-stabilizing optical element to a position outside an anti-shake driving range (to a position off an optical axis of the optical system) when an optical device that incorporates the anti-shake mechanism moves from an operating state to a lens barrel accommodated state (fully retracted state/non-operating state) in which no pictures are taken has been proposed for the purpose of making a lens barrel compact in size.

The lens barrel disclosed in Japanese Unexamined Patent Publication 2007-163961 is provided, inside a moving ring (provided with lens groups) that is capable of moving in an optical axis direction, with a fixed frame, and an oscillating frame is supported by the fixed frame to be movable in a plane orthogonal to the optical axis with steel balls (rollers) held between the oscillating frame and the fixed frame. An image-stabilizing lens group holding frame which holds an image-stabilizing lens group is pivoted on the oscillating frame to be rotatable about a shaft parallel to the optical axis. When an image-stabilizing operation is performed, the oscillating frame is smoothly moved relative to the fixed frame by an actuator via a support using the steel balls. When the lens barrel is accommodated (fully retracted), the moving ring is moved toward the image plane (rearward in the optical axis direction) to approach a CCD mount. Thereupon, a contact portion of the image-stabilizing lens group holding frame comes in contact with a cam surface of a driving portion provided on the CCD mount. A further retracting movement of the moving ring causes the contact portion of the image-stabilizing lens group holding frame to slide on the cam surface to thereby rotate the image-stabilizing lens group holding frame about the aforementioned rotational shaft. This rotation of the image-stabilizing lens group holding frame causes the image-stabilizing lens group to be removed from a position on the optical axis. According to such a structure, during the lens barrel retracting operation by which the lens barrel is fully retracted, a load in the optical axis direction is applied to the image-stabilizing lens group holding frame with the cam surface and the contact portion in contact with each other, and this load is also transmitted to the oscillating frame. Since steel balls are held between the oscillating frame and the fixed frame as described above, there is a possibility of dents being formed on the steel ball holding surfaces of the oscillating frame and the fixed frame upon an excessive load (e.g., a severe impact) being applied to the lens barrel in the optical axis direction. Such dents deteriorate the operational accuracy of the oscillating frame. In Japanese Unexamined Patent Publication 2007-163961, as a countermeasure against such a problem, the oscillating frame is positioned on the object side (front side in the optical axis direction) of the fixed frame and is biased in a direction to apply pressure to the steel balls (in a direction to approach the fixed frame) by a biasing spring. Application of a load to the image-stabilizing lens group holding frame in the optical axis direction by the cam surface of the CCD mount causes the oscillating frame to move toward the object side against the biasing force of the biasing spring, which prevents an excessive load from being applied to the steel balls.

However, in this structure taught in Japanese Unexamined Patent Publication 2007-163961, there is a possibility of the steel balls falling out as a result of the steel ball holding state not being maintained if the degree of freedom in movement of the oscillating frame toward the object side with respect to the fixed frame is excessively high, and accordingly, the biasing spring is required to be capable of providing a biasing force of more than a predetermined magnitude. On the other hand, if the biasing force of the biasing spring is excessively great, the moving load of the oscillating frame on the fixed frame becomes excessively great. Therefore, to satisfy a self-contradictory demand for curbing resistance to movement of the oscillating frame during the image-stabilizing operation while securing the holding of the steel balls even under the condition in which a pressing force produced via the cam surface of the CCD mount is transmitted to the oscillating frame to thereby cause the oscillating frame to move away from the fixed frame, it becomes extremely difficult to adjust the spring force of the biasing spring.

Additionally, in this structure taught in Japanese Unexamined Patent Publication 2007-163961, loads imposed on the image-stabilizing lens group holding frame in the optical axis direction are unavoidable since the image-stabilizing lens group holding frame is pressed by the cam surface of the CCD mount. The image-stabilizing lens group holding frame is a member for holding a lens group, and the positional accuracy of the image-stabilizing lens group holding frame directly affects the optical performance, so that it is desirable not to impose loads on the image-stabilizing lens group holding frame as much as possible. In addition, since the image-stabilizing lens group holding frame is held by the oscillating frame thereon, the relative position between the contact portion of the image-stabilizing lens group holding frame and the cam surface of the CCD mount varies depending on the position of movement of the oscillating frame, so that it is difficult to determine the mutual contact point with precision. On this account, a smooth retracting operation of the image-stabilizing lens group holding frame might be sacrificed.

SUMMARY OF THE INVENTION

The present invention has been devised in view of the above-mentioned drawbacks and provides a position controller for an optical element which can be moved to correct image shake and also moved onto and removed from an optical axis, wherein the position controller, though simple in structure, is configured to achieve a light-duty high-precision driving.

According to an aspect of the present invention, a position controller is provided for an optical element provided in a photographing optical system which moves between a ready-to-photograph state and an accommodated state in which no pictures are taken, including an advancing/retracting member movable in an optical axis direction of the photographing optical system, wherein the advancing/retracting member is moved between a first position at which the photographing optical system is in the ready-to-photograph state and a second position at which the photographing optical system is in the accommodated state; an anti-shake moving member supported by the advancing/retracting member to be movable along a first plane orthogonal to the optical axis; an insertable/removable moving member which holds the optical element and is supported by the anti-shake moving member to be movable between an insertion position in which the optical element is positioned on the optical axis and a removed position in which the optical element is removed from the optical axis; an insertion holder which holds the insertable/removable moving member in the insertion position when the photographing optical system is in the ready-to-photograph state; a removal drive member which is supported by the advancing/retracting member to be movable along a second plane orthogonal to the optical axis, relative to the advancing/retracting member, between an insertion allowance position in which the removal drive member is in noncontact with the insertable/removable moving member in the insertion position, to thereby allow the anti-shake moving member to move in a moving range thereof, and a forced removing position in which the removal drive member comes in contact with and presses the insertable/removable moving member to move the insertable/removable moving member from the insertion position to the removed position; and an insertion/removal controller which holds the removal drive member in the insertion allowance position when the photographing optical system is in the ready-to-photograph state, and moves the removal drive member from the insertion allowance position to the forced removing position when the advancing/retracting member moves from the first position to the second position.

It is desirable for the position controller to include an anti-shake driver which drives the anti-shake moving member in the first plane to perform an image-stabilizing operation in accordance with vibrations applied to the photographing optical system.

It is desirable for the insertion/removal controller to include a biasing member which biases the removal drive member toward the insertion allowance position; a stopper provided on the advancing/retracting member, the removal drive member being brought into contact with the stopper by a biasing force of the biasing member to thereby determine the insertion allowance position; and a component force imparting member which is positioned away from the removal drive member in the optical axis direction when the photographing optical system is in the ready-to-photograph state, wherein, when the advancing/retracting member moves in the optical axis direction from the first position to the second position, the component force imparting member comes in contact with the removal drive member while reducing a distance between the component force imparting member and the removal drive member in the optical axis direction and imparts a component force to the removal drive member to move the removal drive member from the insertion allowance position to the forced removing position.

It is desirable for the advancing/retracting member to move from an object side to an image plane side when the photographing optical system moves from the ready-to-photograph state to the accommodated state. The position controller further includes a first flat surface formed on the advancing/retracting member, the first flat surface being orthogonal to the optical axis and facing toward the image plane side; a second flat surface formed on the anti-shake moving member, the flat surface being orthogonal to the optical axis and facing toward the object side so as to face the first flat surface; an anti-shake guide member which is held between the first flat surface and the second flat surface and allows the anti-shake moving member to move relative to the advancing/retracting member in the first plane; and a biasing member which biases the anti-shake moving member with respect to the advancing/retracting member in a direction to bring the first flat surface and the second flat surface close to each other to keep the anti-shake guide member held between the first flat surface and the second flat surface. The removal drive member is supported by the advancing/retracting member to be positioned closer to the image plane side than the anti-shake moving member.

It is desirable for the anti-shake guide member to include at least one spherical roller.

It is desirable for the photographing optical system to be provided in a lens barrel, wherein the component force imparting member is fixed inside the lens barrel and is positioned closer to the image plane side than the advancing/retracting member when the photographing optical system is in the ready-to-photograph state, and the component force imparting member includes a projection which projects toward the object side.

It is desirable for the insertable/removable moving member to be pivotally supported by the anti-shake moving member to be rotatable about a first rotational shaft that is parallel to the optical axis, and for the removal drive member to be pivotally supported by the advancing/retracting member to be rotatable about a second rotational shaft that is parallel to the first rotational shaft.

It is desirable for the insertable/removable moving member to include a pressing-force receiving part formed as an outer peripheral surface of a cylindrical projection, the axis of which extends parallel to the optical axis, wherein the removal drive member includes a removal pressing portion formed as a flat surface extending in a radial direction of rotation of the removal drive member. When the insertable/removable moving member is in the insertion position and the removal drive member is in the insertion allowance position, the pressing-force receiving part and the removal pressing portion are spaced away from each other while facing each other, and wherein the removal pressing portion comes into contact with the pressing-force receiving part when the removal drive member rotates from the insertion allowance position toward the forced removing position.

It is desirable for the insertion holder to include a biasing member which biases and moves the insertable/removable moving member toward the insertion position, and a stopper provided on the anti-shake moving member, the insertable/removable moving member being brought into contact with the stopper by a biasing force of the biasing member to thereby determine the insertion position.

It is desirable for the position controller to be incorporated in a camera having a retractable lens barrel.

It is desirable for the advancing/retracting member to be guided linearly in the optical axis direction without rotating in the retractable lens barrel.

It is desirable for the anti-shake drive mechanism to include an electromagnetic actuator.

It should be noted that neither of the first position and the second position of the advancing/retracting member is limited to a single specified position with respect to the optical axis direction, and each includes the case where the optical axis position thereof changes at the ready-to-photograph state or at the accommodated state. For example, in the case where the present invention is applied to a zoom lens system which performs zooming by moving the advancing/retracting member in the optical axis direction, the first position can refer to any position within the moving range along the optical axis direction during zooming in the ready-to-photograph state. Similarly, the second position can refer to any position of the advancing/retracting member within a predetermined range along in the optical axis direction in the accommodated state.

According to the present invention, in the position controller for an optical element which can be moved to correct image shake and also moved onto and removed from an optical axis, a lens barrel retracting operation from a ready-to-photograph state to the lens barrel accommodated state can be performed without imposing loads in an optical axis direction on the insertable/removable moving member that supports an optical element and the anti-shake moving member that supports the insertable/removable moving member. Additionally, the removing operation of the insertable/removable moving member can be performed without being influenced by the position of the anti-shake moving member. Consequently, the image-stabilizing operation and the insertion/removal operation of the optical element can be performed with a high degree of precision, with a reduced load, and with a simple structure.

The present disclosure relates to subject matter contained in Japanese Patent Applications Nos. 2011-42027 (filed on Feb. 28, 2011) and 2011-76925 (filed on Mar. 31, 2011) which are expressly incorporated herein by reference in their entireties.

BRIEF DESCRIPTION OF THE DRAWINGS

The present invention will be described below in detail with reference to the accompanying drawings in which.

DESCRIPTION OF THE PREFERRED EMBODIMENT

Figure 1:
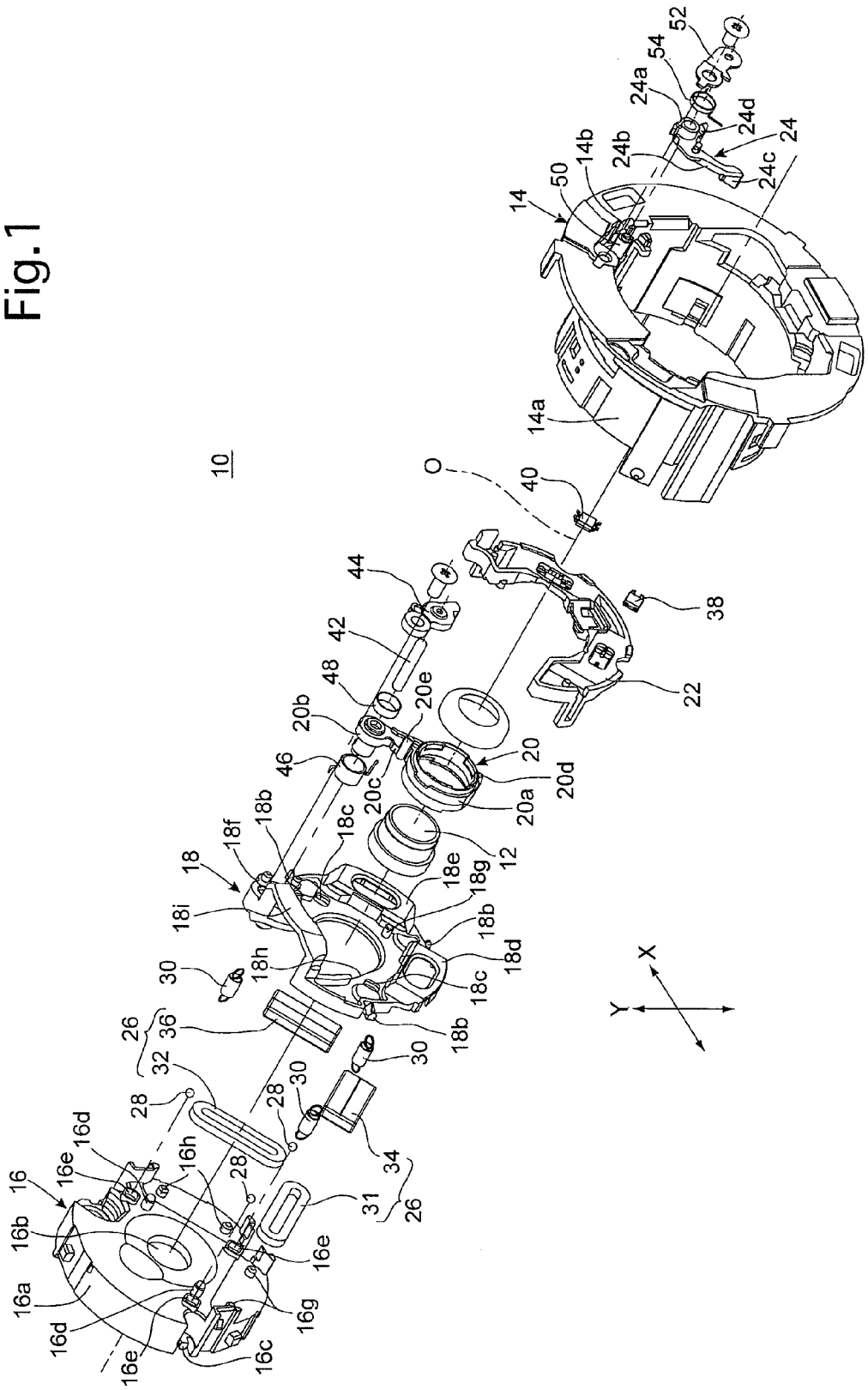
FIG. 1 is a rear exploded perspective view of an embodiment of an anti-shake lens unit according to the present invention that is designed for a lens shutter camera having a retractable photographic lens.
Figure 2:
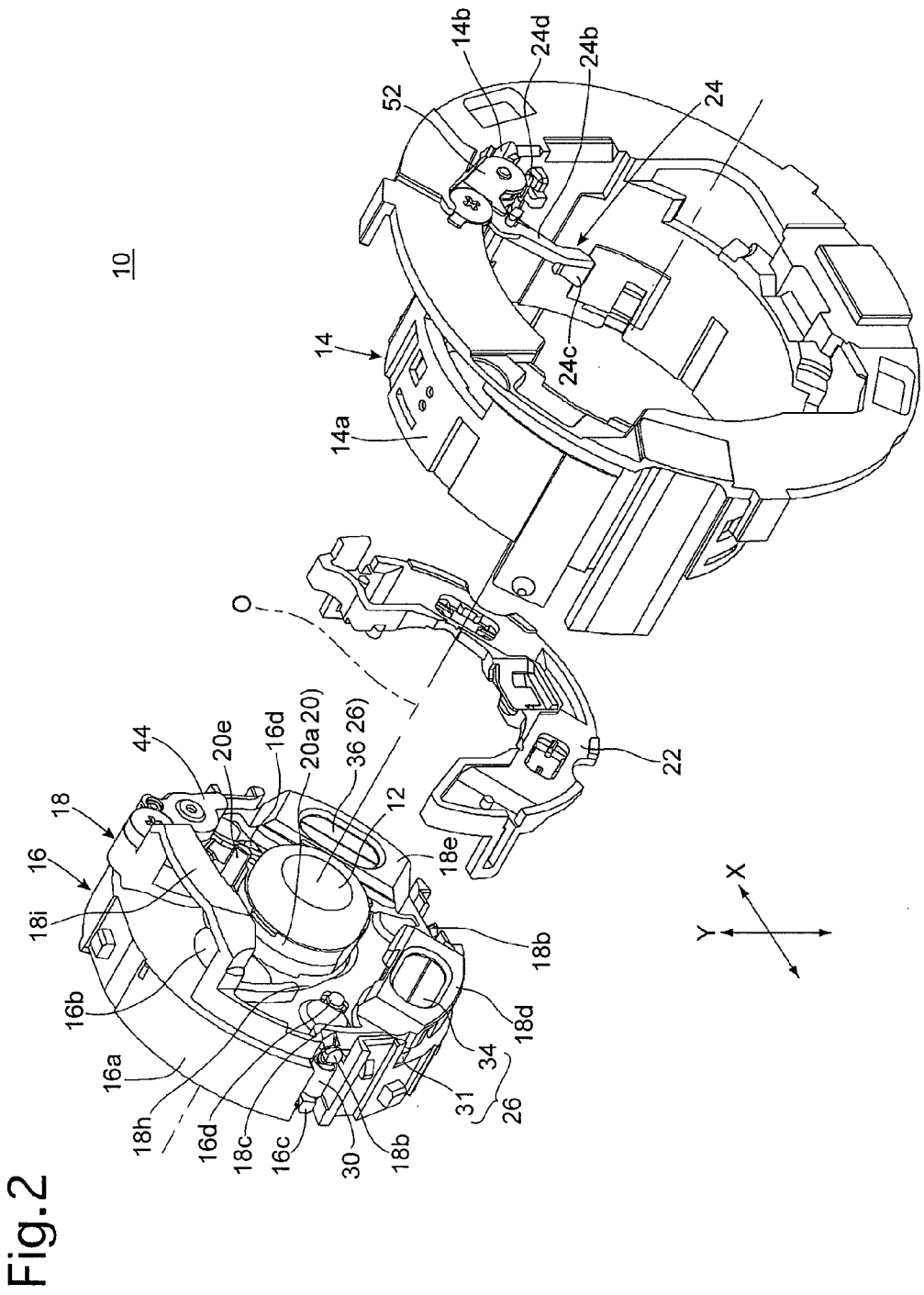
FIG. 2 is an exploded rear perspective view of the anti-shake lens unit with a sensor holder and a linear moving ring dismounted.
Figure 3:
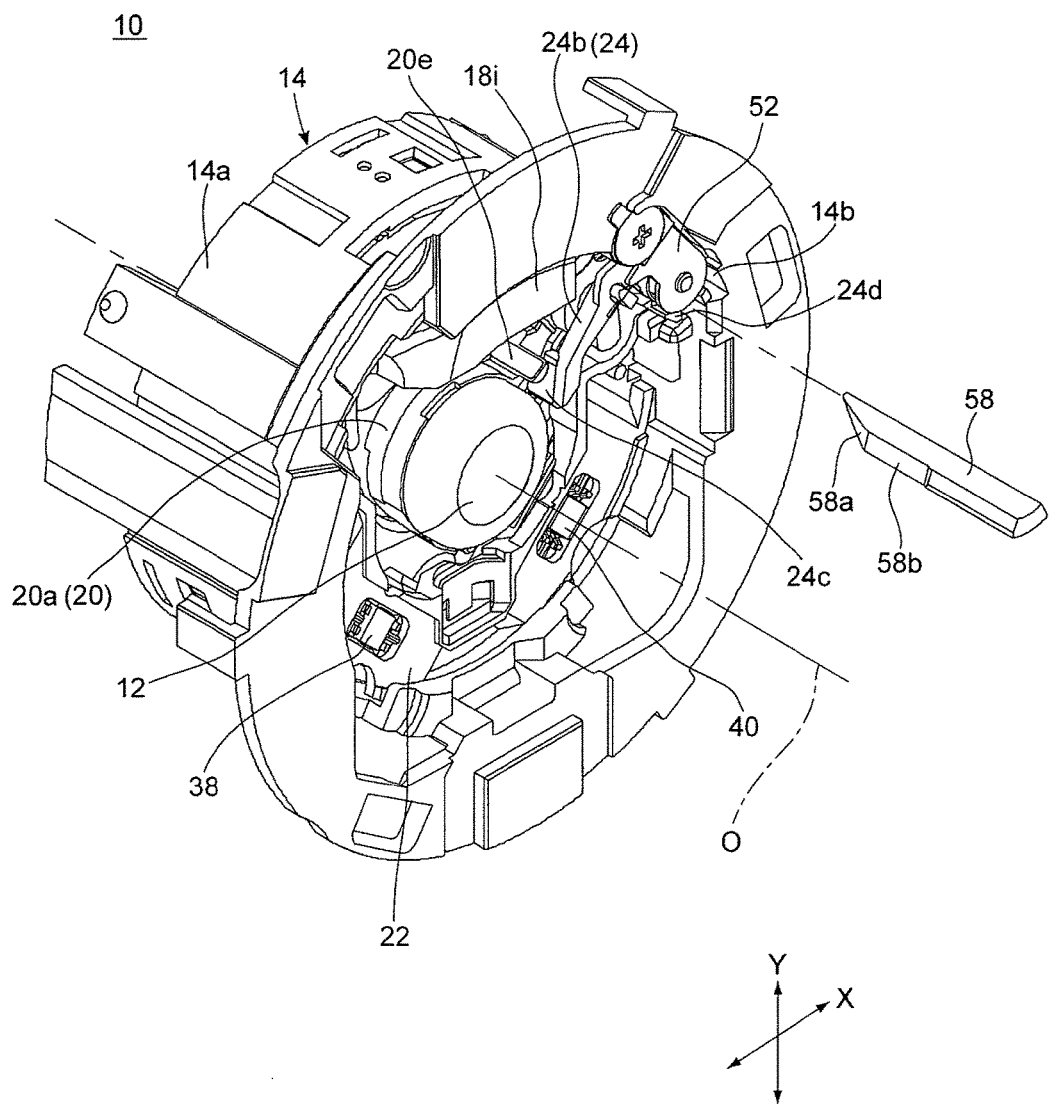
FIG. 3 is a rear perspective view of the anti-shake lens unit and an insertion/removal control-projection in the middle of the lens barrel retracting operation of the lens barrel.

An anti-shake lens unit 10 shown in FIGS. 1 through 3 supports an insertable/removable image-stabilizing lens (optical element) 12 which constitutes a part of a photographing optical system of a lens barrel of a camera. As shown in FIG. 1, the anti-shake lens unit 10 is provided with a linear moving ring (advancing/retracting member) 14, and is provided in the linear moving ring 14 with a shutter unit (advancing/retracting member) 16, an anti-shake frame (anti-shake moving member) 18, an insertable/removable frame (insertable/removable moving member) 20, a sensor holder 22, a removal drive lever (removal drive member) 24 and an anti-shake drive actuator (anti-shake driver) 26.

Although the overall structure of the lens barrel in which the anti-shake lens unit 10 is incorporated is not shown in the drawings, the linear moving ring 14 is supported inside the lens barrel thereby in a manner to be linearly movable in a direction along a photographing optical axis O of the photographing optical system, and the linear moving ring 14 is moved toward an image plane (second position) from the object side (first position) when the lens barrel is brought into a lens barrel accommodated state (fully retracted state) from a ready-to-photograph state. In the following descriptions, the optical axis direction refers to a direction along or parallel to the photographing optical axis O, and the front and the rear refer to the front (object side) and the rear (image plane side) with respect to the optical axis direction. A known cam mechanism or the like can be adapted as a mechanism for moving the linear moving ring 14 in the optical axis direction.

The linear moving ring 14 is provided with a cylindrical portion 14a which surrounds the photographing optical axis O, and the shutter unit 16 is fixed to the inside of the cylindrical portion 14a. The shutter unit 16 is provided with a shutter housing 16a including a shutter (not shown) and has a photographing aperture 16b (see FIG. 1) which extends through a center of the shutter housing 16a in the optical axis direction. A shutter actuator provided in the shutter unit 16 drives the above-mentioned shutter to open and shut the photographing aperture 16b. The shutter housing 16a is provided, at three different circumferential positions on the outer periphery of the shutter housing 16a, with three spring hook projections 16c (only one of which is shown in FIGS. 1 and 2), respectively, and is provided on a rear surface thereof with two movement limit projections (movement limiter) 16d and three ball support holes 16e. The ball support holes 16e are bottomed holes which are open toward the rear (see FIG. 13).

Figure 13:
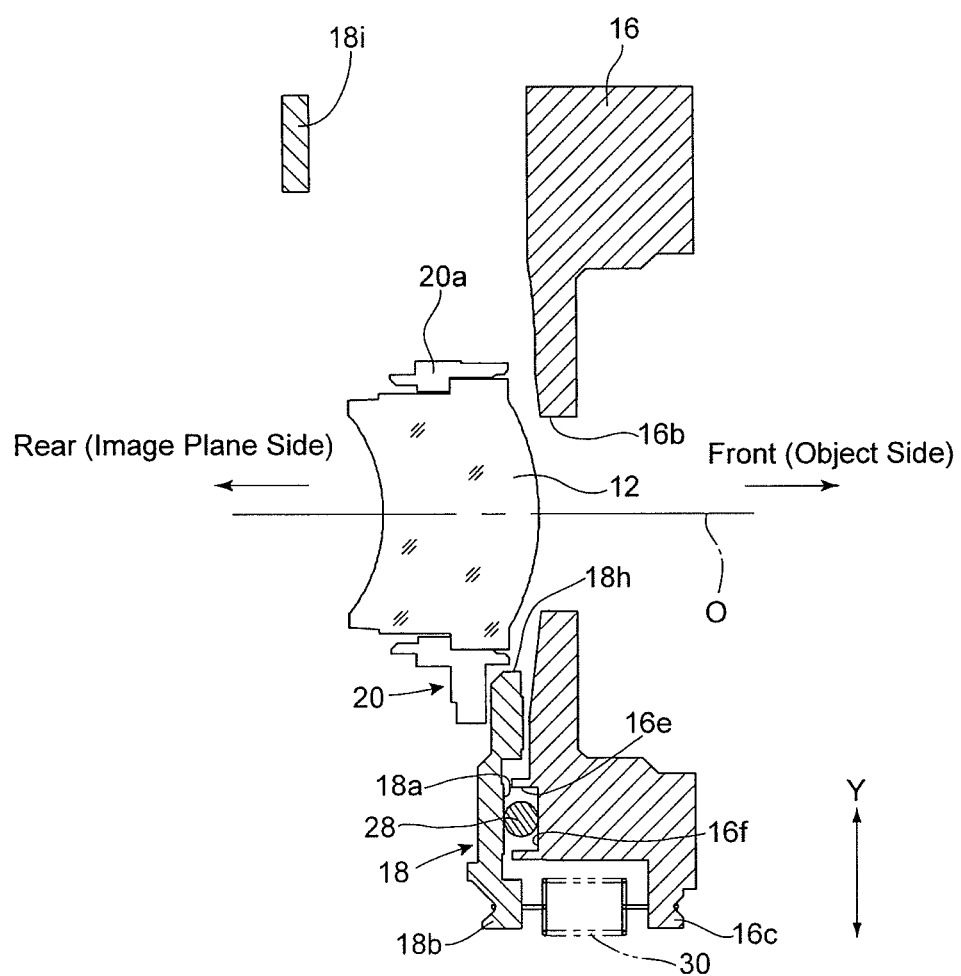
FIG. 13 is a sectional view taken along the line A-A shown in FIG. 12.

The anti-shake frame 18 is supported at the rear of the shutter unit 16. As shown in FIG. 13, three ball contact surfaces (second flat surfaces) 18a are formed on the front of the anti-shake frame 18 that faces the shutter unit 16, and three ball contact surfaces (first flat surfaces) 16f formed as the bottom surfaces of the three ball support holes 16e face the three ball contact surfaces 18a, respectively. Three guide balls (anti-shake guide members) 28 that are formed as spherical rollers are held between the three ball contact surfaces 16f and the three ball contact surfaces 18a, respectively. As mentioned above, the shutter unit 16 is provided with the three ball support holes 16e (the ball contact surfaces 16f), and the three ball contact surfaces 18a and the three guide balls 28 are provided to correspond to the three ball support holes 16e. The three ball contact surfaces 18a are flat surfaces which lie in a plane substantially orthogonal to the photographing optical axis O, and the three ball contact surfaces 16f are flat surfaces which lie in a plane substantially orthogonal to the photographing optical axis O. The three guide balls 28 are loosely fitted in the three ball support holes 16e, respectively, so that there is a clearance between each guide ball 28 and the inner wall of the associated ball support hold 16e in directions substantially orthogonal to the photographing optical axis O. When positioned in the vicinity of the center of the associated support hole 16e, each guide ball 28 does not come in contact with the inner wall of the associated ball support hole 16e.

The anti-shake frame 18 is provided, at there different circumferential positions on the outer periphery thereof, with three spring hook projections 18b, respectively, and three extension springs (biasing member) 30 are extended and installed between the three spring hook projections 18b and the three spring hook projections 16c, respectively. The anti-shake frame 18 is biased in a direction to approach the shutter unit 16 (i.e., is biased forward) by the biasing force of the three extension springs 30 to make the three ball contact surfaces 18a press against the three guide balls 28, respectively, to thereby prevent the anti-shake frame 18 from moving forward. In this state, the three ball contact surfaces 18a are in point contact with the three guide balls 28, respectively, and the anti-shake frame 18 can freely move in directions orthogonal to the photographing optical axis O by making the three ball contact surfaces 18a slidingly contact the three guide balls 28 (or while making the three guide balls 28 roll when the three guide balls 28 are not in contact with the inner walls of the three ball support holes 16e, respectively).

The anti-shake frame 18 is further provided with two movement limit holes (movement limiter) 18c into which the two movement limit projections 16d of the shutter unit 16 are inserted, respectively. As shown in FIGS. 6 through 12, the inner wall of each movement limit hole 18c is rectangular, generally square in shape in a plane substantially orthogonal to the photographing optical axis O. In the following descriptions, the direction of one of the two diagonal lines across the inner wall of each movement limit hole 18c in a plane orthogonal to the photographing optical axis O refers to the X-axis direction and the direction of the other diagonal line refers to the Y-axis direction. The anti-shake frame 18 can freely move relative to the shutter unit 16 (the linear moving ring 14) in a plane orthogonal to the photographing optical axis O within a range until the movement limit projections 16d come into contact with the inner walls of the two movement limit holes 18c, respectively.

The anti-shake frame 18 is driven by the anti-shake drive actuator 26. The anti-shake drive actuator 26 is provided with two coils 31 and 32 which are supported by the shutter unit 16, and is further provided with two permanent magnets 34 and 36 which are supported by the anti-shake frame 18. The two permanent magnets 34 and 36 are fixed to two magnet holding portions 18d and 18e, respectively, which are provided on the anti-shake frame 18. The permanent magnets 34 and 36 are substantially identical in shape and size to each other. Each of the permanent magnets 34 and 36 is in the shape of a narrow, thin rectangular plate. The permanent magnets 34 and 36 are arranged symmetrically with respect to an imaginary plane P (see FIGS. 6 through 12) which lies on the photographing optical axis O and is extends in the Y-axis direction. More specifically, opposite sides of a magnetic pole boundary line M1 (see FIGS. 8 and 11) of the permanent magnet 34 which extends in the lengthwise direction thereof and passes through an approximate center of the permanent magnet 34 with respect to the width thereof are magnetized into north and south poles, respectively, while opposite sides of a magnetic pole boundary line M2 (see FIGS. 8 and 11) of the permanent magnet 36 which extends in the lengthwise direction thereof and passes through an approximate center of the permanent magnet 36 with respect to the width thereof are magnetized into north and south poles, respectively. In other words, each of the magnetic pole boundary lines M1 and M2 define a boundary between north and south poles of each of the permanent magnets 34 and 36, respectively. The magnetic pole boundary line M1 of the permanent magnet 34 and the magnetic pole boundary line M2 of the permanent magnet 36 are inclined to each other so that the distance therebetween (i.e., the distance from the imaginary plane P) increases in an increasingly upward direction (toward a removed position of the insertable/removable frame 20 which will be discussed later) from the bottom end in the Y-axis direction (from an insertion position side of the insertable/removable frame 20 which will be discussed later). The inclination angle of each magnetic pole boundary line M1 and M2 with respect to the imaginary plane P is set to approximately 45 degrees. Namely, the lengthwise directions (the magnetic pole boundary lines M1 and M2) of the permanent magnets 34 and 36 are substantially orthogonal to each other.

Figure 8:
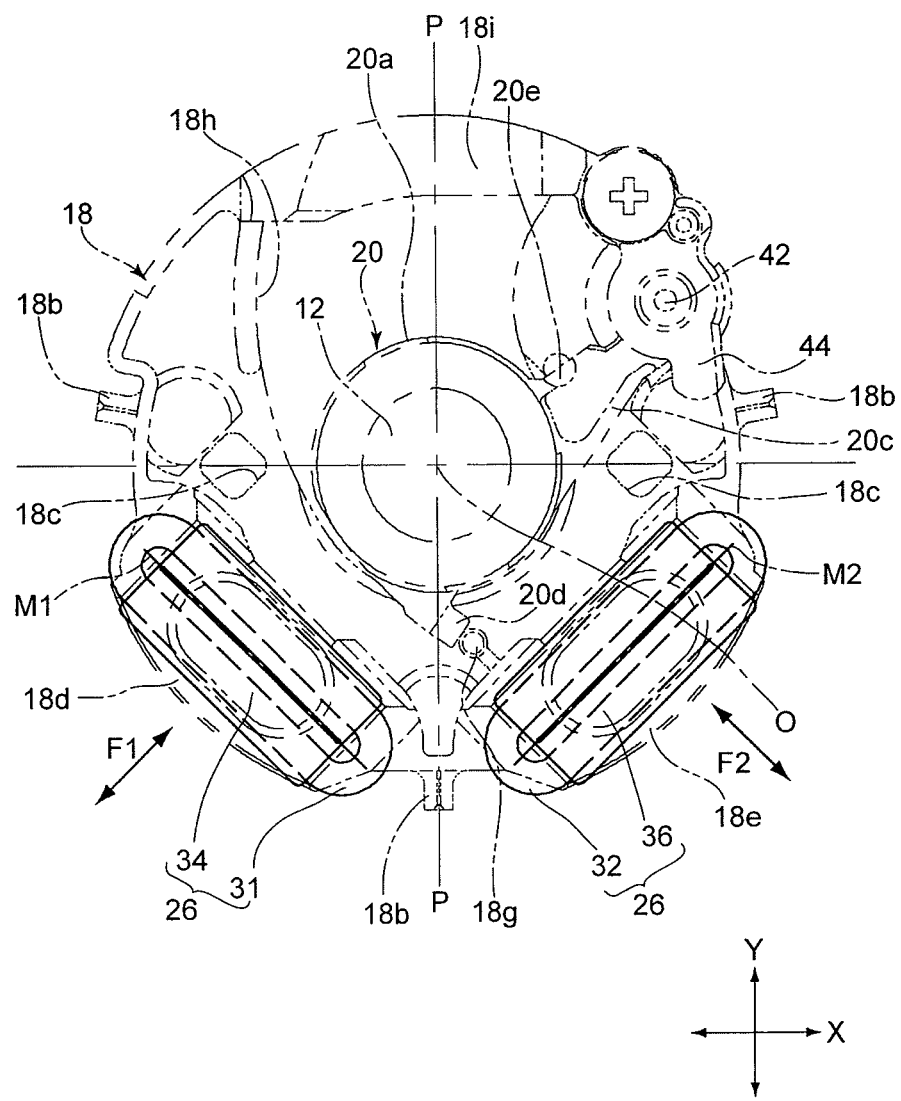
FIG. 8 is a diagram of the elements of an anti-shake drive actuator shown in FIG. 7 shown in a manner to emphasize these elements.
Figure 11:
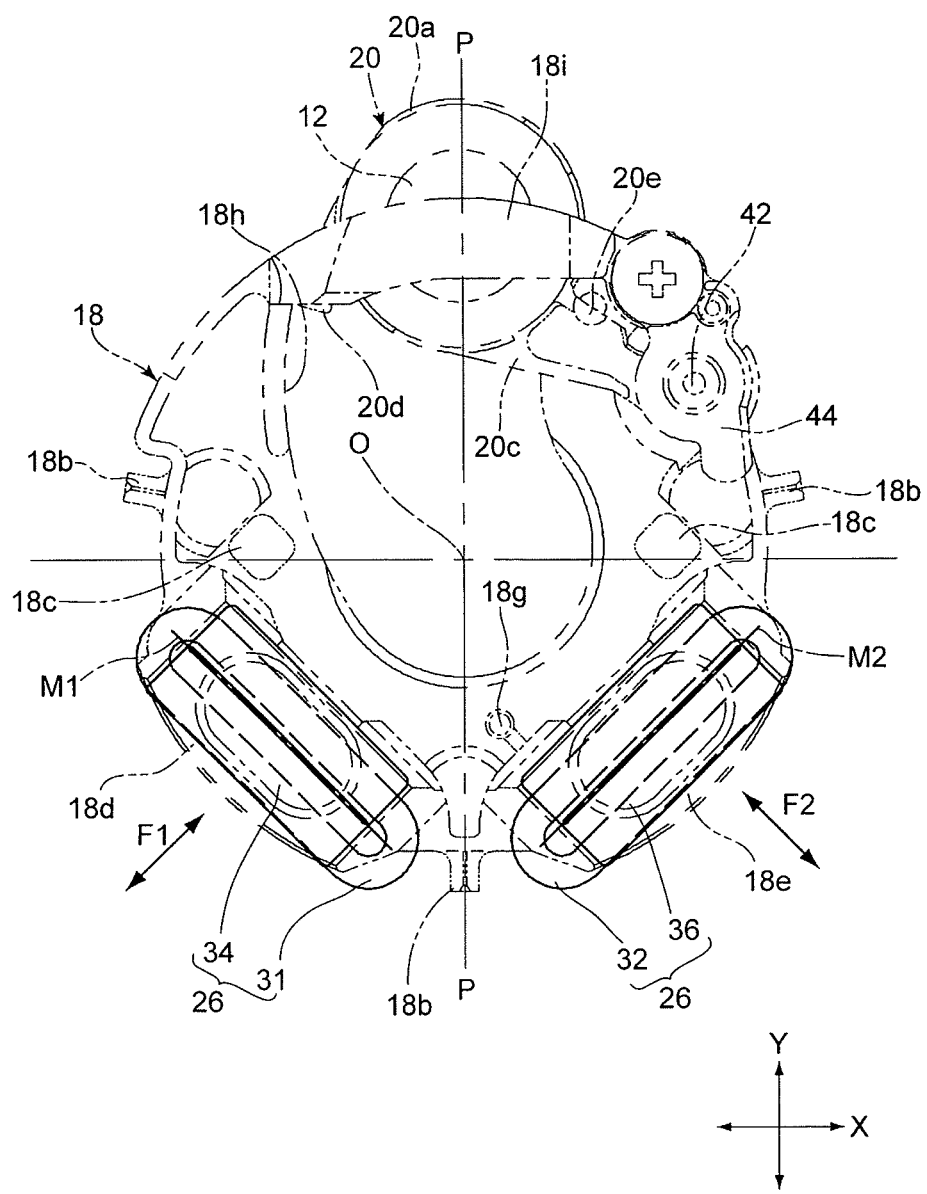
FIG. 11 is a diagram of the elements of the anti-shake drive actuator shown in FIG. 10 shown in a manner to emphasize these elements.
Figure 12:
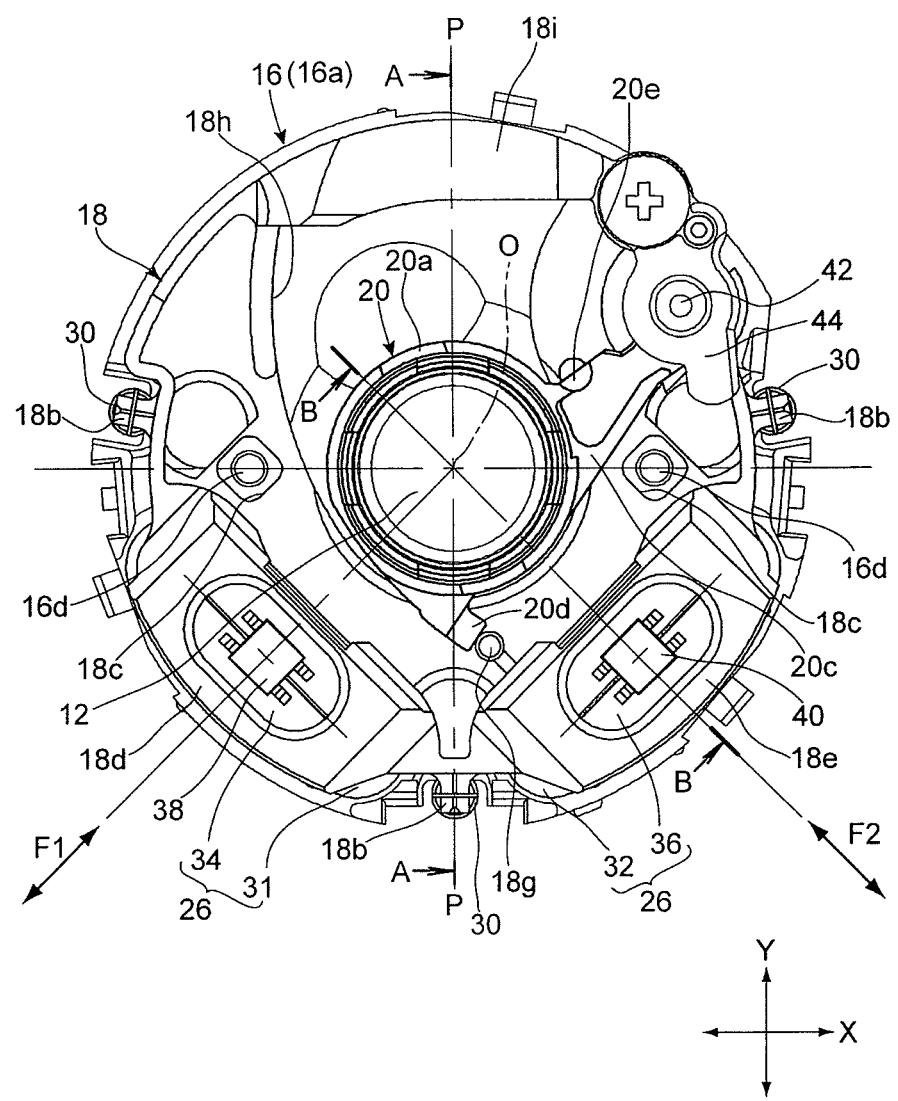
FIG. 12 is a rear elevational view of the anti-shake lens unit in the ready-to-photograph state with the linear moving ring and the sensor holder removed, viewed from the image plane side.

As shown in FIGS. 1, 8 and 11, each of the coils 31 and 32 is an air-core coil which includes a pair of elongated portions that are substantially parallel to each other and a pair of curved (U-shaped) portions which connect the pair of elongated portions at respective ends thereof. The coils 31 and 32 are substantially identical in shape and size to each other. The shutter housing 16a is provided on the rear thereof with a pair of positioning projections 16g and a pair of positioning projections 16h (see FIG. 1). The coil 31 is supported on the shutter unit 16 with the pair of positioning projections 16g engaged into the air-core portion of the coil 31, and the coil 32 is supported on the shutter unit 16 with the pair of positioning projections 16h engaged into the air-core portion of the coil 32. In this supporting state, the lengthwise direction of the coil 31 is substantially parallel to the magnetic pole boundary line M1 and the lengthwise direction of the coil 32 is substantially parallel to the magnetic pole boundary line M2. The coils 31 and 32 are connected to a flexible PWB (printed wiring board (not shown)) which extends from the shutter unit 16, and are further connected to a control circuit board of the camera, in which the present embodiment of the anti-shake lens unit 10 is incorporated, via another flexible PWB (not shown) provided inside the lens barrel. The control of power that is applied to the coils 31 and 32 is performed by a control circuit on the above-mentioned control circuit board.

Figure 14:
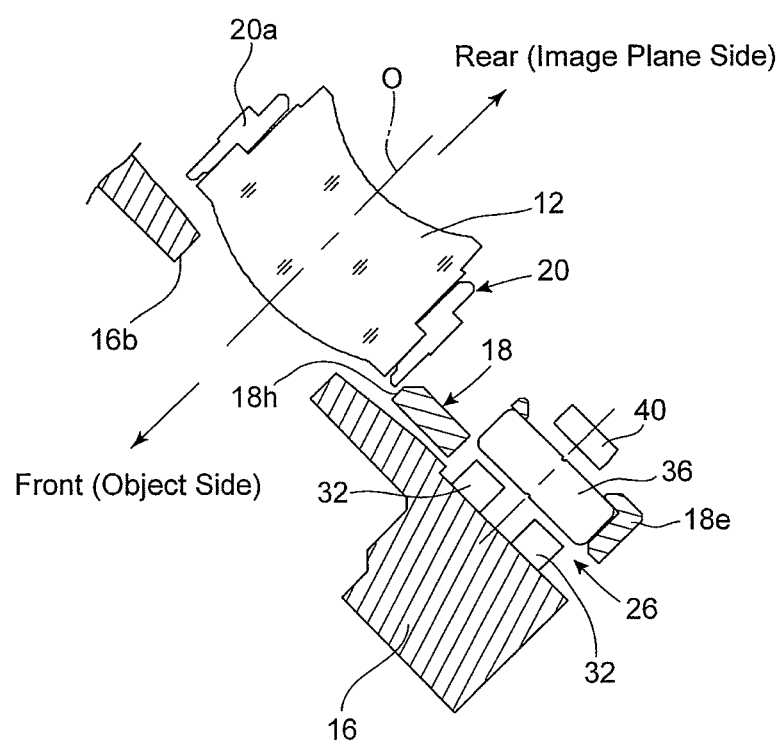
FIG. 14 is a sectional view taken along the line B-B shown in FIG. 12.

In the anti-shake drive actuator 26 that has the above described structure, the coil 31 and the permanent magnet 34 face each other in the optical axis direction, and a driving force is generated in a direction substantially orthogonal to the magnetic pole boundary line M1 of the permanent magnet 34 (i.e., orthogonal to the lengthwise direction of the coil 31) in a plane orthogonal to the optical axis O upon the coil 31 being energized. The direction of action of this driving force is shown by a double-headed arrow F1 in FIGS. 8, 11 and 12. In addition, the coil 32 and the permanent magnet 36 face each other in the optical axis direction as shown in FIG. 14, and a driving force is generated in a direction substantially orthogonal to the magnetic pole boundary line M2 of the permanent magnet 36 (i.e., orthogonal to the lengthwise direction of the coil 32) in a plane orthogonal to the optical axis O upon the coil 32 being energized. The direction of action of this driving force is shown by a double-headed arrow F2 in FIGS. 8, 11 and 12. The direction of action of each of the two aforementioned driving forces intersects both the X-axis direction and the Y-axis direction at an angle of approximately 45 degrees, so that the anti-shake frame 18 can be moved to any arbitrary position in a plane orthogonal to the photographing optical axis O by controlling the passage of current through each of the coils 31 and 32. As described above, the moving range of the anti-shake frame 18 is limited by engagement of the inner walls of the two movement limit holes 18c with the two movement limit projections 16d, respectively.

The sensor holder 22 is fixed to the rear of the anti-shake frame 18. The sensor holder 22 has a shape covering the rear sides of the two magnet holding portions 18d and 18e and supports two position detection sensors 38 and 40 that are respectively positioned behind the two permanent magnets 34 and 36. The position detection sensors 38 and 40 are connected to the aforementioned flexible PWB (not shown), which extends from the shutter unit 16, and are further connected to the aforementioned control circuit board of the camera, in which the present embodiment of the anti-shake lens unit 10 is incorporated, via the aforementioned other flexible PWB (not shown) provided inside the lens barrel. The drive position of the anti-shake frame 18 that is driven by the anti-shake drive actuator 26 can be detected via the position detection sensors 38 and 40.

The anti-shake lens unit 10 is provided with an insertable/removable frame 20 which is supported by the anti-shake frame 18 thereon to be rotatable (swingable) about a rotational shaft 42 that extends parallel to the photographing optical axis O. The front end of the rotational shaft 42 is fixedly fitted into a shaft support hole 18f formed in the anti-shake frame 18, and the rear end of the rotational shaft 42 is fixed to a retaining member 44 fixed to the anti-shake frame 18. The insertable/removable frame 20 is provided with a cylindrical lens holder portion 20a, a shaft bearing portion 20b and an arm portion 20c. The cylindrical lens holder portion 20a holds the insertable/removable image-stabilizing lens 12, the rotational shaft 42 is inserted into the shaft bearing portion 20b, and the cylindrical lens holder portion 20a and the shaft bearing portion 20b are connected via the arm portion 20c. The insertable/removable frame 20 is swingable (rotatable) about the rotational shaft 42 between the insertion position shown in FIGS. 2 through 8 and 12 and the removed position shown in FIGS. 9 through 11, and the insertion position is defined by engagement of a stopper contact portion 20d formed on the cylindrical lens holder portion 20a with a stopper (an element of an insertion holder) 18g formed on the anti-shake frame 18. The insertable/removable frame 20 is biased toward the insertion position by an insertable/removable frame biasing spring (an element of the insertion holder/biasing member) 46. The insertable/removable frame biasing spring 46 is configured of a torsion coil spring, the ends of which are hooked onto the anti-shake frame 18 and the insertable/removable frame 20, respectively. In addition, an optical-axis-direction biasing spring 48 configured of a compression spring is installed between the shaft bearing portion 20b and the retaining member 44, and the insertable/removable frame 20 is biased forward by the optical-axis-direction biasing spring 48 so that the position of the insertable/removable frame 20 in the optical axis direction is stabilized.

When the insertable/removable frame 20 is in the insertion position, the insertable/removable image-stabilizing lens 12 is positioned on the photographing optical axis O. When the insertable/removable frame 20 rotates to the removed position in a state where the anti-shake frame 18 is at the movement limit thereof in the Y-axis direction (hereinafter referred to as the removal assisting position), in which the end of the inner wall of the movement limit holes 18c of the anti-shake frame 18 on the insertion position side (the lower end of the inner wall of each movement limit hole 18c with respect to FIGS. 6 through 12) comes into contact with the associated movement limit projection 16d, the center of the insertable/removable image-stabilizing lens 12 is displaced from the photographing optical axis O in the Y-axis direction. A clearance hole 18h, the shape of which corresponds to the path of movement of the cylindrical lens holder portion 20a that is defined by the arc-shaped path about the rotational shaft 42, is formed through the anti-shake frame 18, and the front end of the cylindrical lens holder portion 20a is positioned in the clearance hole 18h when the insertable/removable frame 20 is at the removed position. The clearance hole 18h is open at (extends through) a portion of the outer periphery of the anti-shake frame 18, and the anti-shake frame 18 is provided over this opening portion with a reinforcing bridge 18i. As can be seen in FIGS. 1 and 2, the reinforcing bridge 18i is offset rearwardly to be prevented from interfering with the cylindrical lens holder portion 20a when the insertable/removable frame 20 rotates to the removed position.

Figure 6:
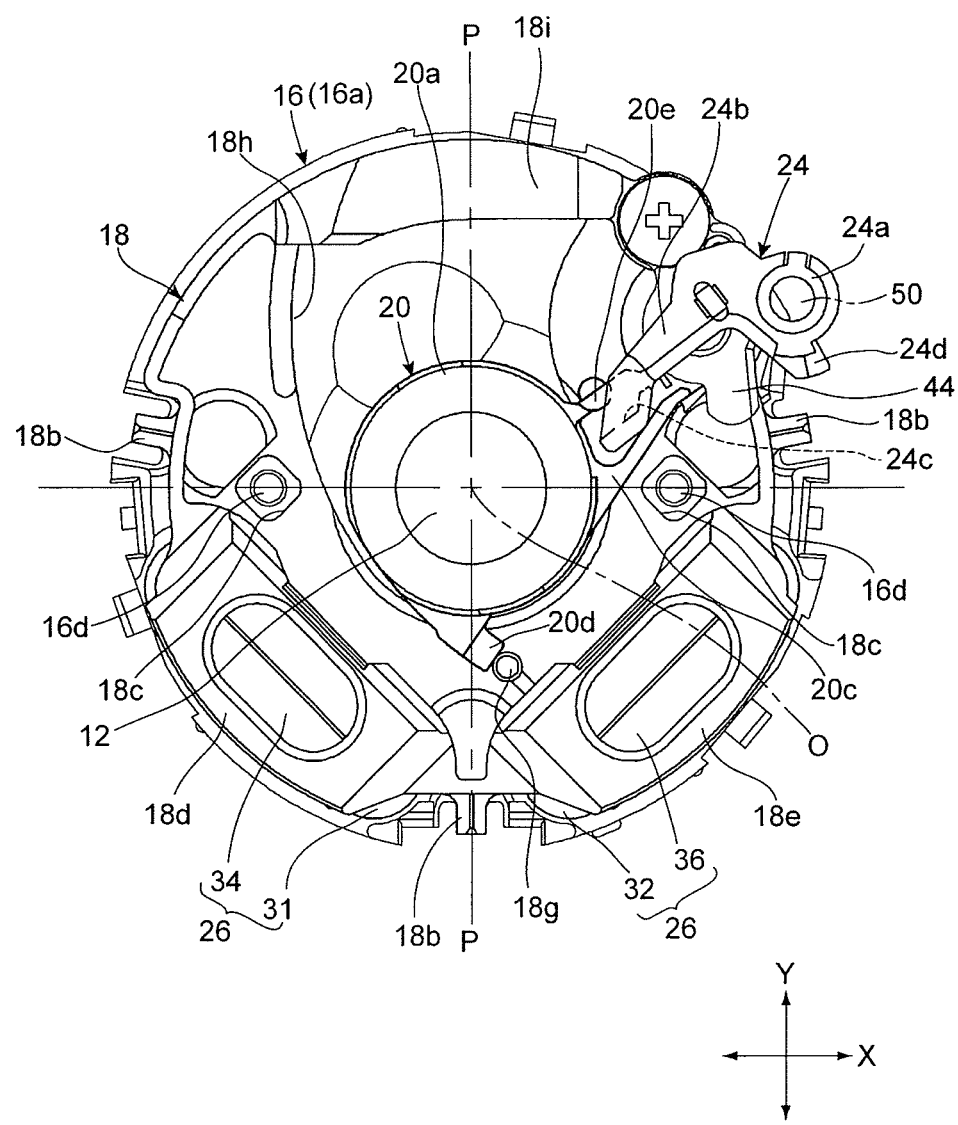
FIG. 6 is a rear elevational view of part of the anti-shake lens unit in the ready-to-photograph state of the lens barrel, viewed from the image plane side.
Figure 7:
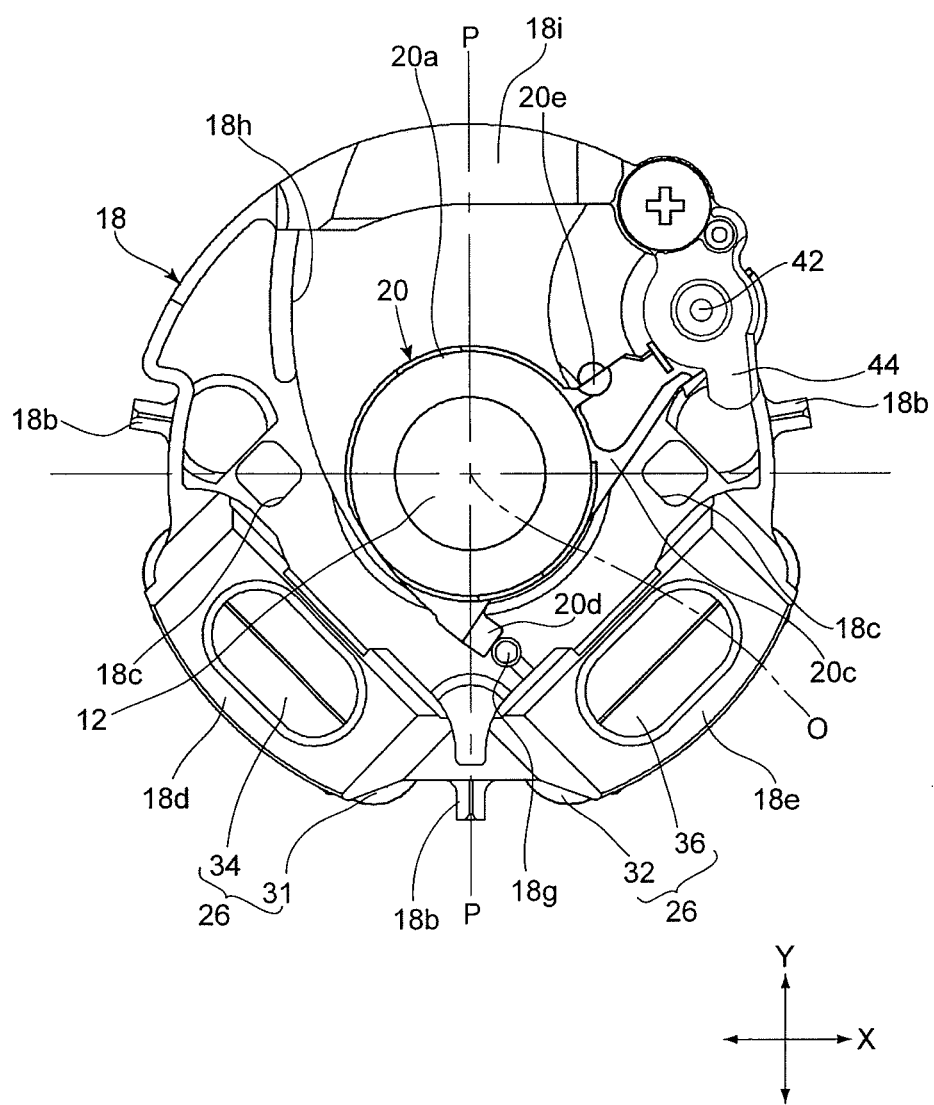
FIG. 7 is a rear elevational view that shows elements of the anti-shake lens unit shown in FIG. 6 which are driven during an image-stabilizing operation and coils shown in FIG. 6.
Figure 9:
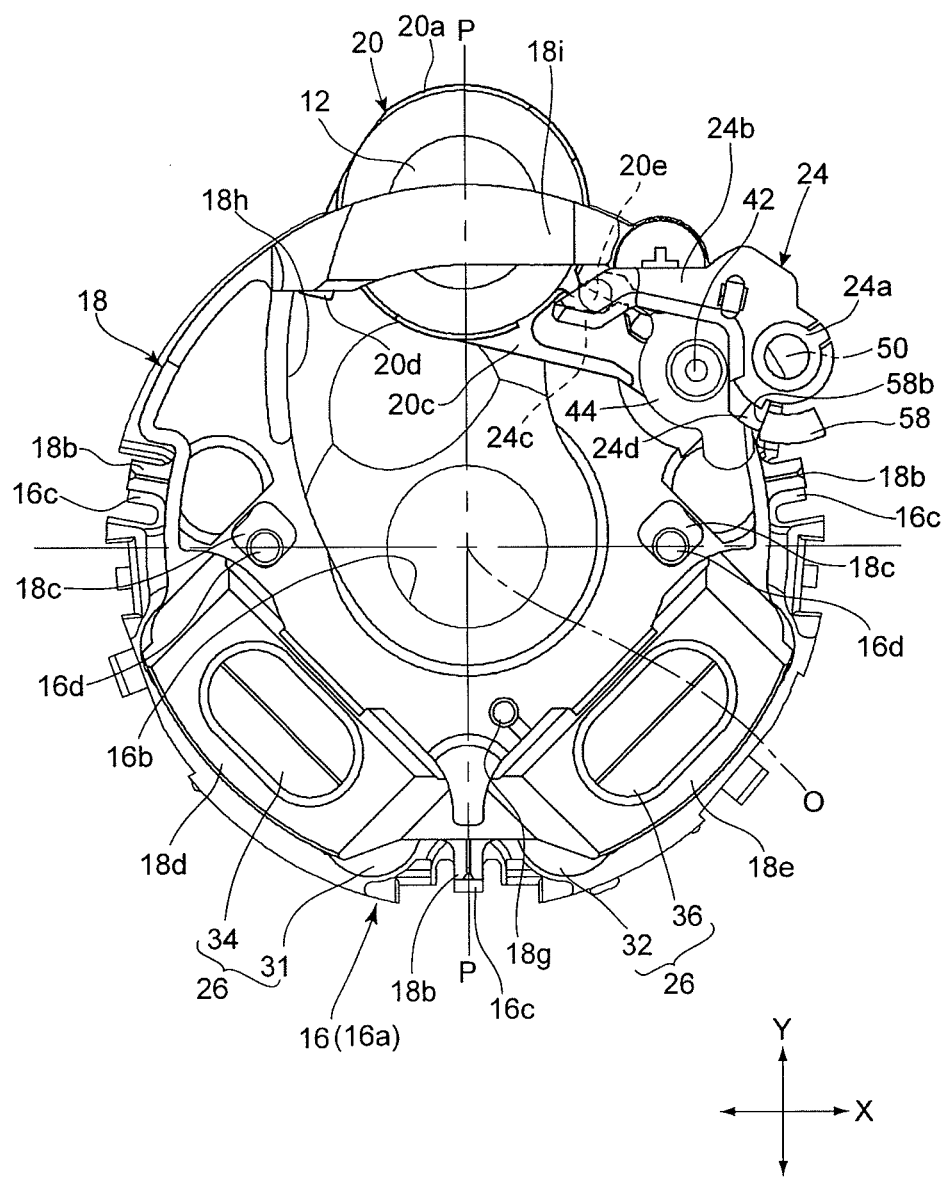
FIG. 9 is a rear elevational view of the portion of the anti-shake lens unit shown in FIG. 6 in a lens barrel accommodated state (fully-retracted state) of the lens barrel.

The removal drive lever 24 is positioned in the linear moving ring 14 and supported thereby to be rotatable (swingable) about a rotational shaft 50 that is parallel to the photographing optical axis O between an insertion allowance position shown in FIG. 6 and a forced removing position shown in FIG. 9. The rotational shaft 50 is formed integral with the linear moving ring 14 so as to be positioned in the vicinity of the rotational shaft 42. The rotational shaft 50 is inserted into a shaft hole formed through a shaft bearing portion 24a of the removal drive lever 24. A retaining plate 52 is fixed to the rear of the linear moving ring 14 to prevent the removal drive lever 24 from moving rearward. The removal drive lever 24 is provided with an arm portion 24b which extends radially from the shaft bearing portion 24a and is further provided in the vicinity of the free end of the arm portion 24b with a removal pressing portion 24c that is capable of coming into contact with a pressing-force receiving part 20e formed on the arm portion 20c of the insertable/removable frame 20.

Figure 4:
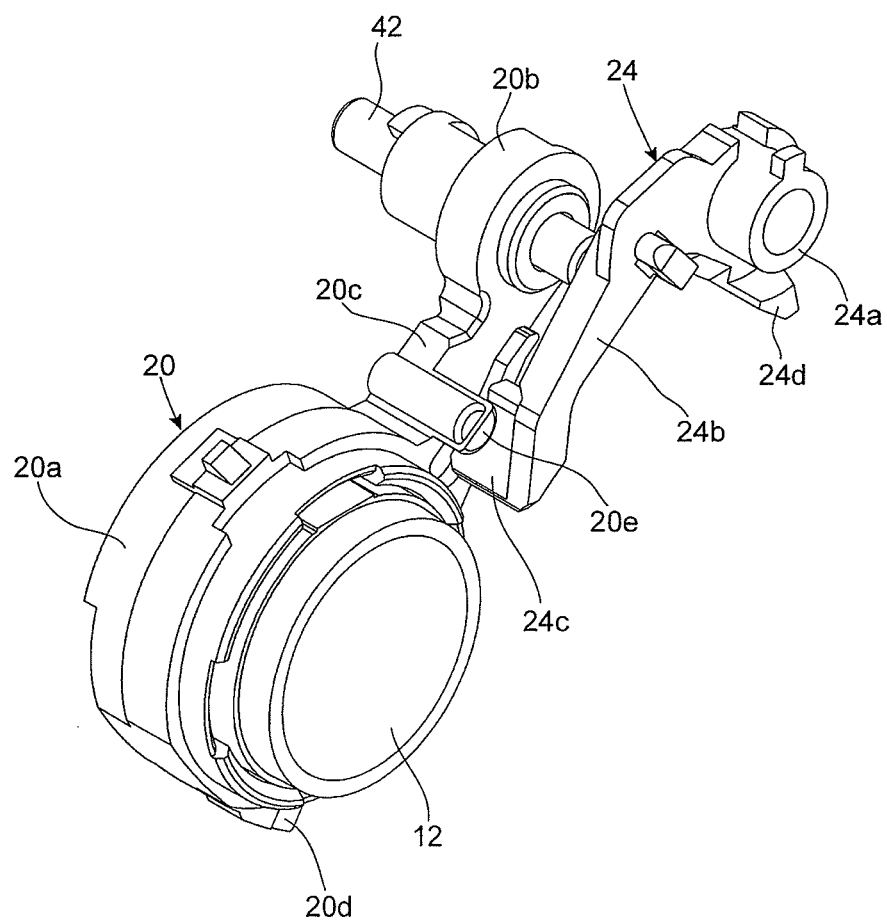
FIG. 4 is a rear perspective view of an insertable/removable frame and a removal drive lever, showing the positional relationship therebetween in a ready-to-photograph state of the lens barrel.
Figure 5:
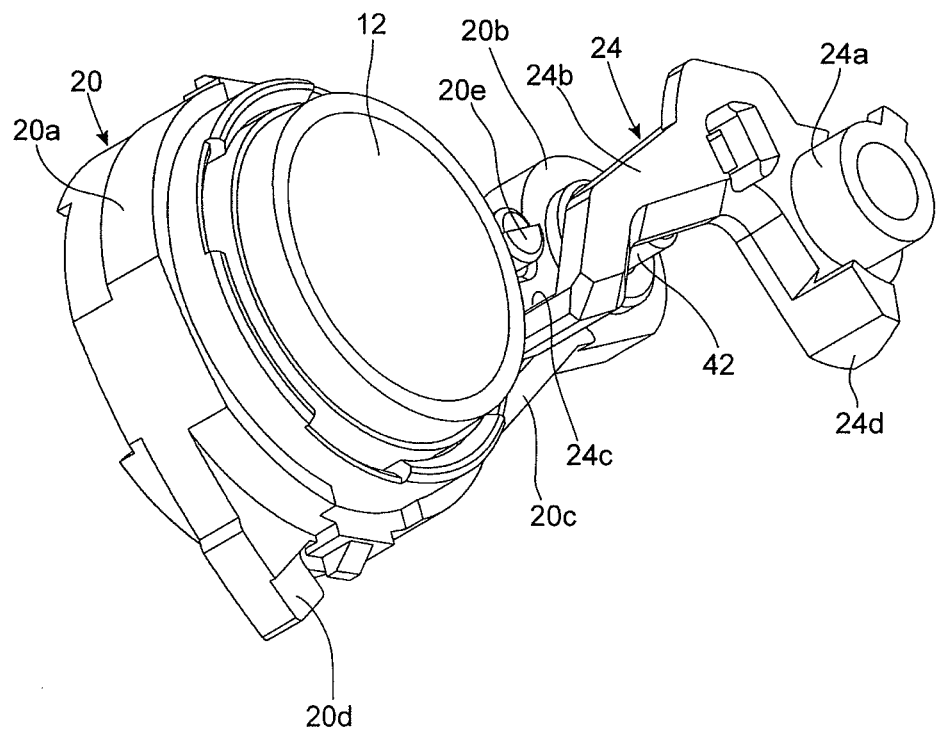
FIG. 5 is a rear perspective view of the insertable/removable frame and the removal drive lever in the ready-to-photograph state of the lens barrel, viewed from a different angle.

As shown in FIGS. 4 and 5, the removal pressing portion 24c is a flat surface which extends outwardly in a radial direction of rotation of the removal drive lever 24. The pressing-force receiving part 20e is formed as an outer peripheral surface of a cylindrical projection, the axis of which extends parallel to the optical axis O and which faces the flat surface that constitutes the removal pressing portion 24c. Therefore, the positional relationship between the removal pressing portion 24c and the pressing-force receiving part 20e is such that no force in a direction parallel to the photographing optical axis O is transmitted from the removal drive lever 24 to the insertable/removable frame 20 though a force in a rotational direction is transmitted from the removal drive lever 24 to the insertable/removable frame 20.

The biasing force of the insertable/removable frame biasing spring 46 urges the insertable/removable frame 20 to rotate toward the insertion position from the removed position (counterclockwise direction with respect to FIGS. 6 through 12), and the removal drive lever 24 is also biased to rotate in the same direction (counterclockwise direction with respect to FIGS. 6 through 12) toward the insertion allowance position by a removal drive lever biasing spring (an element of an insertion/removal controller/biasing member) 54. A stopper (an element of the insertion/removal controller) 14b (see FIGS. 1 through 3) which determines the rotation limit of the removal drive lever 24 in the biasing direction of the removal drive lever biasing spring 54, i.e., the insertion allowance position of the removal drive lever 24, is formed on the inside of the linear moving ring 14. The stopper 14b is formed as a grooved portion formed on an inner peripheral surface of the linear moving ring 14, and a portion of a pressing-force receiving part 24d which is formed on the removal drive lever 24 in the vicinity of the shaft bearing portion 24a comes into contact with an inner surface of the grooved portion 14b when the insertion allowance position of the removal drive lever 24 is determined. On the other hand, rotation of the insertable/removable frame 20 in the biasing direction of the insertable/removable frame biasing spring 46 is limited by engagement between the stopper contact portion 20d and the stopper 18g. FIG. 6 shows a state where the insertable/removable frame 20 and the removal drive lever 24 are in contact with the stopper 18g and the aforementioned stopper (not shown) of the linear moving ring 14, respectively, and at this stage the pressing-force receiving part 20e and the removal pressing portion 24c are spaced from each other (see FIGS. 4 and 5). The clearance between the pressing-force receiving part 20e and the removal pressing portion 24c is determined to be such a degree as to prevent the pressing-force receiving part 20e from coming in contact with the removal pressing portion 24c in the moving range of the anti-shake frame 18 relative to the shutter unit 16 (i.e., the aforementioned range until the movement limit projections 16d come into contact with the inner walls of the two movement limit holes 18c, respectively). In other words, when in the insertion allowance position, the removal drive lever 24 does not interfere with either the anti-shake driving operations of the anti-shake frame 18 or the insertable/removable frame 20, which are performed by the anti-shake drive actuator 26. If no external force is exerted on the insertable/removable frame 20 and the removal drive lever 24, the state shown in FIGS. 6 through 8, in which the insertable/removable frame 20 is held in the insertion position by the biasing force of the insertable/removable frame biasing spring 46, is maintained.

The removal drive lever 24 is provided in the vicinity of the shaft bearing portion 24a with the pressing-force receiving part 24d. A insertion/removal control-projection (an element of the insertion/removal controller/component force imparting member) 58 (see FIG. 3) is a stationary member which is fixed to the inside of the lens barrel to be positioned behind the removal drive lever 24. Rearward movement of the linear moving ring 14 when the lens barrel moves from a ready-to-photograph state to the lens barrel accommodated state causes the insertion/removal control-projection 58 to come into contact with and press the pressing-force receiving part 24d to rotate the removal drive lever 24 from the insertion allowance position to the forced removing position. More specifically, the insertion/removal control-projection 58 is provided at the front end thereof with an end-face cam 58a, and retracting movement of the linear moving ring 14 toward the insertion/removal control-projection 58 causes the pressing-force receiving part 24d to come into contact with the end-face cam 58a. Subsequently, a further retracting movement of the linear moving ring 14 with the pressing-force receiving part 24d remaining in contact with the end-face cam 58a causes a component force which makes the removal drive lever 24 rotate in a direction against the biasing force of the removal drive lever biasing spring 54 (in a direction toward the removed position of the insertable/removable frame 20) created from the rearward moving force of the linear moving ring 14 in the optical axis direction, so that the removal drive lever 24 solely rotates by an amount of rotation corresponding to the aforementioned clearance, which causes the removal pressing portion 24c to come into contact with the pressing-force receiving part 20e of the insertable/removable frame 20. Thereupon, the pressing force in the direction toward the removed position of the insertable/removable frame 20 is transmitted to the insertable/removable frame 20 via the removal pressing portion 24c and the pressing-force receiving part 20e, which causes the removal drive lever 24 to press and rotate the insertable/removable frame 20 toward the removed position against the biasing forces of both the insertable/removable frame biasing spring 46 and the removal drive lever biasing spring 54. After the insertable/removable frame 20 reaches the removed position, a removed-lens holding surface 58b which is formed on a side of the insertion/removal control-projection 58 to extend substantially parallel to the optical axis O is engaged with a side of the pressing-force receiving part 24d, so that the removal drive lever 24 is held in the forced removing position; consequently, the insertable/removable frame 20 is held in the removed position (see FIG. 9). The insertion/removal control-projection 58 can be provided on any fixed member which constitutes an element of the lens barrel; however, if the present embodiment of the lens barrel is a digital camera to which a lens barrel is integrally provided, it is recommendable that an image sensor holder which holds an image sensor at an image-forming position of a photographing optical system be provided as a fixed member positioned closer to the image plane than the linear moving ring 14 and that the insertion/removal control-projection 58 projects from the aforementioned image sensor holder.

Operations of the anti-shake lens unit 10 that has the above described structure will be discussed hereinafter. In a ready-to-photograph state shown in FIGS. 6 through 8, the insertable/removable frame 20 is held at the insertion position by the biasing force of the insertable/removable frame biasing spring 46, and the center (optical axis) of the insertable/removable image-stabilizing lens 12 is coincident with the photographing optical axis O. In addition, the removal drive lever 24 is held at the insertion allowance position by the biasing force of the removal drive lever biasing spring 54. In this ready-to-photograph state, deviations (image shake) of an object image focused on an image plane can be reduced by driving the insertable/removable image-stabilizing lens 12 in directions orthogonal to the photographing optical axis O by the anti-shake drive actuator 26 in accordance with the direction and magnitude of vibrations applied to the lens barrel (i.e. to the photographing optical system). More specifically, the angular velocities of the lens barrel are detected by gyro sensors, and are time-integrated to determine a moving angle, and subsequently, from this moving angle, the moving amounts of the image on the focal plane in the X-axis direction and in the Y-axis direction are calculated while the driving amounts and the driving directions of the insertable/removable image-stabilizing lens (the anti-shake frame 18) for the respective axial directions are calculated in order to cancel out the image shake. Subsequently, the passage of current through each of the coils 31 and 32 is controlled in accordance with the calculated values. Thereupon, the anti-shake frame 18 is moved while being supported by the three guide balls 28 at the three ball contact surfaces 18a. When the anti-shake frame 18 is driven to perform an anti-shake driving operation, the insertable/removable frame 20 is held in the insertion position, in which the stopper contact portion 20d is made to contact the stopper 18g, so that the anti-shake frame 18 and the insertable/removable frame 20 (the insertable/removable image-stabilizing lens 12) integrally move. Since a clearance is provided between the pressing-force receiving part 20e and the removal pressing portion 24c as described above, the removal drive lever 24 does not restrict the anti-shake driving operation of the anti-shake frame 18 together with the insertable/removable frame 20 that is performed by the anti-shake drive actuator 26.

In a ready-to-photograph state, it is possible to calibrate the position detection sensors 38 and 40 by utilizing information on the positions of movement limits of the anti-shake frame 18, where each of the two movement limit projections 16d comes into contact with the inner wall of the associated movement limit hole 18c of the anti-shake frame 18. The direction of action of each of the two driving forces F1 and F2, which are respectively generated by a combination of the coil 31 and the permanent magnet 34 and a combination of the coil 32 and the permanent magnet 36, intersects both the X-axis direction and the Y-axis direction at an angle of approximately 45 degrees. Accordingly, the movement limits of each movement limit hole 18c in the X-axis direction relative to the associated movement limit projection 16d (defined by the each laterally opposed corner (end) of each movement limit hole 18c coming into contact with the associated movement limit projection 16d) can be used as reference positions for driving the anti-shake frame 18 in the X-axis direction by the anti-shake drive actuator 26, and the movement limits of each movement limit hole 18c in the Y-axis direction relative to the associated movement limit projection 16d (defined by each vertically opposed corner (end) of each movement limit hole 18c coming into contact with the associated movement limit projection 16d) can be used as reference positions for driving the anti-shake frame 18 in the Y-axis direction by the anti-shake drive actuator 26. A practical anti-shake driving range of the anti-shake frame 18 in a ready-to-photograph state is defined within a range in which each movement limit projection 16d does not come into contact with the inner wall of the associated movement limit hole 18c.

When the lens barrel moves from a ready-to-photograph state to the lens barrel accommodated state, the anti-shake lens unit 10 (the linear moving ring 14) is moved rearward in the optical axis direction by a motor (not shown) for driving the whole lens barrel forward and rearward, and the pressing-force receiving part 24d of the removal drive lever 24 which retracts with the linear moving ring 14 comes in contact with the end-face cam 58a of the insertion/removal control-projection 58. A further rearward movement of the linear moving ring 14 causes the pressing-force receiving part 24d to be pressed by the end-face cam 58a. Thereupon, a component force is produced from the retracting force of the linear moving ring 14, so that the removal drive lever 24 is rotated toward the forced removing position from the insertion allowance position against the biasing force of the removal drive lever biasing spring 54 to thereby cause the removal pressing portion 24c to come into contact with the pressing-force receiving part 20e. The insertable/removable frame 20 is acted upon by a biasing force of the insertable/removable frame biasing spring 46 toward the insertion position as described above, and the removal drive lever 24 with the removal pressing portion 24c in contact with the pressing-force receiving part 20e presses the insertable/removable frame 20 toward the removed position from the insertion position against the biasing force of the insertable/removable frame biasing spring 46. In addition, the anti-shake frame 18, which supports the insertable/removable frame 20, is acted upon by the biasing force of the three extension springs 30 in a direction to press the three ball contact surfaces 18a against the three guide balls 28. Namely, the insertable/removable frame biasing spring 46 and the extension spring 30 exert spring resistance on movements of the insertable/removable frame 20 and the anti-shake frame 18, respectively. Here the rotational resistance of the insertable/removable frame 20 that is caused by the insertable/removable frame biasing spring 46 is predetermined to be greater than the resistance to movement of the anti-shake frame 18 that is caused by the extension spring 30. Therefore, the pressing force acting on the insertable/removable frame 20 is transmitted to the anti-shake frame 18, thus causing the anti-shake frame 18 to move with the insertable/removable frame 20 toward the removed position before the commencement of rotation of the insertable/removable frame 20 toward the removed position. Subsequently, the anti-shake frame 18 is moved to the removal assisting position (shown in FIGS. 9 through 11), in which the end of the inner wall of each of the two movement limit holes 18c of the anti-shake frame 18 on the insertion position side in the Y-axis direction comes into contact with the associated movement limit projection 16d. Since the aforementioned practical anti-shake driving range of the anti-shake frame 18 in a ready-to-photograph state includes no points where the inner wall of each movement limit hole 18c comes into contact with the associated movement limit projection 16d as described above, the removal assisting position is positioned outside the anti-shake driving range. Immediately after the anti-shake frame 18 is prevented from moving beyond the removal assisting position after reaching the removal assisting position, the insertable/removable frame 20 is solely rotated from the insertion position to the removed position. Accordingly, the movement of the insertable/removable image-stabilizing lens 12 to the removed position thereof (shown in FIGS. 9 through 11) is performed as the result of a combination of the movement of the anti-shake frame 18 to the removal assisting position in the Y-axis direction and the rotation of the insertable/removable frame 20 to the removed position relative to the anti-shake frame 18.

Figure 10:
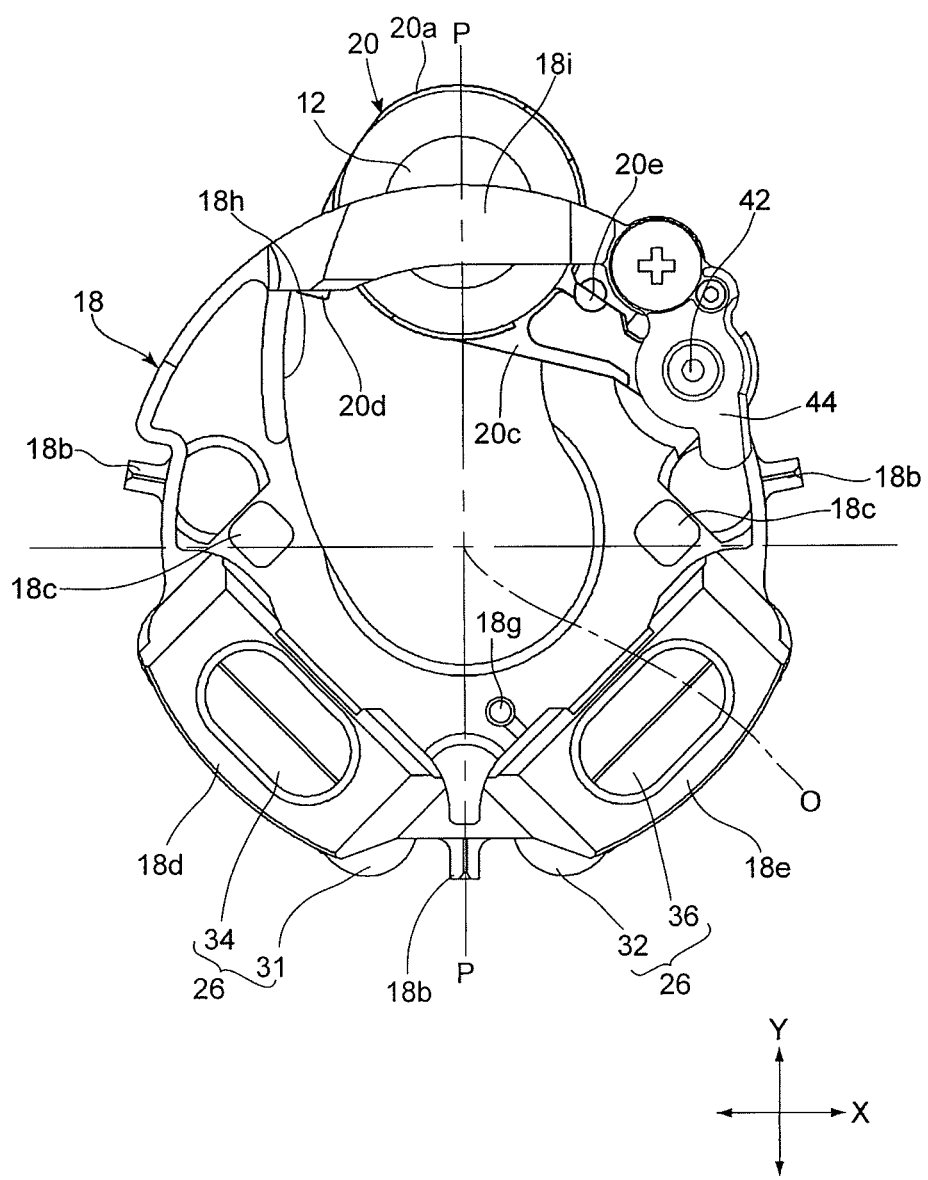
FIG. 10 is a rear elevational view of elements of the anti-shake lens unit shown in FIG. 9 which are driven during an image-stabilizing operation and the coils shown in FIG. 9.

The insertable/removable image-stabilizing lens 12 is removed from a position on an optical path (the photographing optical axis O) as shown in FIGS. 9 through 11 due to the movement of the anti-shake frame 18 to the removal assisting position and the rotation of the insertable/removable frame 20 to the removed position. A further rearward movement of the linear moving ring 14 causes the removed-lens holding surface 58b of the insertion/removal control-projection 58 to come in contact with the pressing-force receiving part 24d of the removal drive lever 24, thereby holding the removal drive lever 24 in the forced removing position (see FIG. 9), so that the insertable/removable frame 20 together with the removal drive lever 24 is held in the removed position by the insertion/removal control-projection 58 and is prevented from rotating toward the insertion position. Although not shown in the drawings, upon the lens barrel reaching the lens barrel accommodated state, a member positioned behind the insertable/removable image-stabilizing lens 12 (e.g., an optical element other than the insertable/removable image-stabilizing lens 12 which is positioned behind the insertable/removable image-stabilizing lens 12 in a ready-to-photograph state) enters an open space created by a removal of the insertable/removable image-stabilizing lens 12 (the cylindrical lens holder portion 20a). This structure makes it possible to reduce the length of the lens barrel in the optical axis direction in the lens barrel accommodated state of the lens barrel to a smaller degree than a type of lens barrel in which a plurality of optical elements are retracted and accommodated in line along the optical axis thereof.

Conversely, when the lens barrel moves from the lens barrel accommodated state to a ready-to-photograph state, the linear moving ring 14 is moved forward to thereby release the pressing force of the insertion/removal control-projection 58 against the removal drive lever 24 (i.e., release the holding of the removal drive lever 24 in the forced removing position), which causes the removal drive lever 24 to return to the insertion allowance position shown in FIG. 6 by the biasing force of the insertable/removable frame biasing spring 46. Thereupon, the biasing force of the insertable/removable frame biasing spring 46 causes the insertable/removable frame 20 to rotate from the removed position to the insertion position. In association with this rotation, the holding of the anti-shake frame 18 in the removal assisting position is also released, which brings the anti-shake frame 18 into a state where it can be driven by the anti-shake drive actuator 26. Thereafter, upon the lens barrel moving to a ready-to-photograph state, the aforementioned calibration operation for the position detection sensors 38 and 40 is performed.

In the anti-shake lens unit 10, the removal drive lever 24 is supported by the linear moving ring 14 therein separately from the insertion/removal frame 20 that supports the insertable/removable image-stabilizing lens 12 and the anti-shake frame 18, and the removal drive lever 24 is moved to the forced removing position by pressing the removal drive lever 24 by the insertion/removal control-projection 58 to press and move the insertion/removal frame 20 to the removed position via the removal drive lever 24 when the lens barrel moves from a ready-to-photograph state to the lens barrel accommodated state. The removal drive lever 24 is supported by the linear moving ring 14 rather than the anti-shake frame 18. Additionally, the rotational shaft 50 that pivotally supports the removal drive lever 24 is parallel to the rotational shaft 42 that pivotally supports the insertion/removal frame 20 so that both the removal drive lever 24 and the insertion/removal frame 20 are rotated along a plane orthogonal to the photographing optical axis O. Accordingly, the region to which the load in the optical axis direction is applied only extends until the removal drive lever 24, and no load in the optical axis direction is imposed on the insertion/removal frame 20 or the anti-shake frame 18. Since the removal pressing portion 24c and the pressing-force receiving part 20e are formed as surfaces having shapes that do not transmit any force in a direction parallel to the photographing optical axis O as described above, the insertion/removal frame 20 is not pressed in a direction along the axis of the rotational shaft 42 even if the removal drive lever 24 which has been pressed by the insertion/removal control-projection 58 slightly moves in a direction along the axis of the rotational shaft 50. This lightens the load on the support mechanism for the insertion/removal frame 20 and the anti-shake frame 18 and ensures a high-precision driving of the insertable/removable image-stabilizing lens 12. Specifically, when the removal drive lever 24 is pressed by the insertion/removal control-projection 58, no excessive loads are applied to the guide balls 28, in the optical axis direction, which are held between the ball contact surfaces 18a and the ball contact surfaces 16f, and accordingly, there is no possibility of dents being made on the ball contact surfaces 18a or the ball contact surfaces 16f.

In addition, since the anti-shake lens unit 10 is structured such that the pressing force in the optical axis direction that is caused by the insertion/removal control-projection 58 does not directly act on the insertable/removable frame 20 or the anti-shake frame 18 due to the installation of the removal drive lever 24 between the insertable/removable frame 20 and the insertion/removal control-projection 58, the biasing force of the extension spring 30, which is for holding the guide balls 28 between the anti-shake frame 18 and the shutter unit 16, can be set without taking into account the load fluctuations in the pressing force caused by the insertion/removal control-projection 58. More specifically, the load on the anti-shake driving actuator 26 that drives the anti-shake frame 18 becomes great if the biasing force of the extension spring 30 is too strong, and the guide balls 28 may fall out if the biasing force of the extension spring 30 is too small; accordingly, one only needs to determine the biasing force of the extension spring 30 while keeping the balance of the biasing force of the extension spring 30 in mind. Unlike the present embodiment of the anti-shake lens unit 10, if the anti-shake lens unit 10 is structured such that the pressing force in the optical axis direction that is caused by the insertion/removal control-projection 58 acts on the anti-shake frame 18, the biasing force of the extension spring 30 which is set in the above manner becomes unbalanced; however, such a problem can be prevented from occurring according to the structure of the present embodiment.

In addition, unlike the insertion/removal frame 20 that varies the position of the rotational shaft 42 in accordance with movement of the anti-shake frame 18, the removal drive lever 24 that is pressed by the insertion/removal control-projection 58 does not vary the position of the rotational shaft 50 in the linear moving ring 14, which makes it possible to maintain a constant positional relationship between the removal drive lever 24 and the insertion/removal control-projection 58 without being influenced by the position of movement of the anti-shake frame 18. Hence, the relative position between the pressing-force receiving part 24d of the removal drive lever 24 and the end-face cam 58a of the insertion/removal control-projection 58 does not vary, so that the removal drive lever 24 can be driven with high precision. Since the point of contact between the removal drive lever 24 and the insertion/removal frame 20 is made by the removal pressing portion 24c, which is a flat surface extending in a radial direction of rotation of the removal drive lever 24, and the pressing-force receiving part 20e, which is an outer peripheral surface of a cylindrical projection, the removal pressing portion 24c can be brought into contact securely with the pressing-force receiving part 20e to make the insertion/removal frame 20 rotate to the removed position even if the position of the insertion/removal frame 20 varies by deviations of the anti-shake frame 18 which are performed to reduce image shake.

Although the present invention has been discussed with reference to the above described embodiment, the present invention is not limited thereto. For instance, the anti-shake frame 18, which manages the moving operation for image shake correction, is supported by the guide balls 28 to be freely movable along a plane orthogonal to the photographing optical axis O, while the insertion/removal frame 20 is pivotally supported by the anti-shake frame 18 thereon via the rotational shaft 42 in the above illustrated embodiment; however, the anti-shake frame 18 and the insertion/removal frame 20 can be replaced by a first stage and a second stage which are linearly movable along the X-axis direction and the Y-axis direction, respectively. In this modified embodiment, it is recommendable that the permanent magnets 34 and 36 of the anti-shake driving actuator 26 be supported by the second stage and that image shake be corrected by movements (deviations) of a combination of the first stage and the second stage.

Although it is the shutter unit 16 that supports the anti-shake frame 18 with the guide balls 28 held between the shutter unit 16 and the anti-shake frame 18 in the above illustrated embodiment, the support member for the anti-shake frame 18 can be any other member. For instance, the anti-shake frame 18 can be movably supported independently of the shutter unit 16 by providing a flange which is formed integral with the inside of the linear moving ring 14 with parts corresponding to the movement limit projections 16*d* and the ball support holes 16*e* (the ball contact surfaces 16*f*).

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A position controller for an optical element provided in a photographing optical system which moves between a ready-to-photograph state and an accommodated state in which no pictures are taken, comprising:
    an advancing/retracting member movable in an optical axis direction of said photographing optical system, wherein said advancing/retracting member is moved between a first position at which said photographing optical system is in said ready-to-photograph state and a second position at which said photographing optical system is in said accommodated state;
    an anti-shake moving member supported by said advancing/retracting member to be movable along a first plane orthogonal to said optical axis;
    an insertable/removable moving member which holds said optical element and is rotatably supported by said anti-shake moving member to be movable between an insertion position in which said optical element is positioned on said optical axis and a removed position in which said optical element is removed from said optical axis;
    an insertion holder which holds said insertable/removable moving member in said insertion position when said photographing optical system is in said ready-to-photograph state;
    a removal drive member which is supported by said advancing/retracting member to be movable along a second plane orthogonal to said optical axis, relative to said advancing/retracting member, between an insertion allowance position in which said removal drive member is in noncontact with said insertable/removable moving member in said insertion position, to thereby allow said anti-shake moving member to move in a moving range thereof, and a forced removing position in which said removal drive member comes in contact with and presses said insertable/removable moving member to move said insertable/removable moving member from said insertion position to said removed position, said removal drive member being separate and distinct from said insertable/removable moving member, and wherein said removal drive member is movable independently of said insertable/removable moving member; and
    an insertion/removal controller which holds said removal drive member in said insertion allowance position when said photographing optical system is in said ready-to-photograph state, and moves said removal drive member from said insertion allowance position to said forced removing position when said advancing/retracting member moves from said first position to said second position.

2. The position controller according to claim 1, further comprising an anti-shake driver which drives said anti-shake moving member in said first plane to perform an image-stabilizing operation in accordance with vibrations applied to said photographing optical system.

3. The position controller according to claim 1, wherein said insertion/removal controller comprises:
    a biasing member which biases said removal drive member toward said insertion allowance position;
    a stopper provided on said advancing/retracting member, said removal drive member being brought into contact with said stopper by a biasing force of said biasing member to thereby determine said insertion allowance position; and
    a component force imparting member which is positioned away from said removal drive member in said optical axis direction when said photographing optical system is in said ready-to-photograph state, wherein, when said advancing/retracting member moves in said optical axis direction from said first position to said second position, said component force imparting member comes in contact with said removal drive member while reducing a distance between said component force imparting member and said removal drive member in said optical axis direction and imparts a component force to said removal drive member to move said removal drive member from said insertion allowance position to said forced removing position.

4. The position controller according to claim 1, wherein said advancing/retracting member moves from an object side to an image plane side when said photographing optical system moves from said ready-to-photograph state to said accommodated state,
    wherein said position controller further comprises:
    a first flat surface formed on said advancing/retracting member, said first flat surface being orthogonal to said optical axis and facing toward said image plane side;
    a second flat surface formed on said anti-shake moving member, said flat surface being orthogonal to said optical axis and facing toward said object side so as to face said first flat surface;
    an anti-shake guide member which is held between said first flat surface and said second flat surface and allows said anti-shake moving member to move relative to said advancing/retracting member in said first plane; and a biasing member which biases said anti-shake moving member with respect to said advancing/retracting member in a direction to bring said first flat surface and said second flat surface close to each other to keep said anti-shake guide member held between said first flat surface and said second flat surface, wherein said removal drive member is supported by said advancing/retracting member to be positioned closer to said image plane side than said anti-shake moving member.

5. The position controller according to claim 4, wherein said anti-shake guide member comprises at least one spherical roller.

6. The position controller according to claim 4, wherein said photographing optical system is provided in a lens barrel, wherein said component force imparting member is fixed inside said lens barrel and is positioned closer to said image plane side than said advancing/retracting member when said photographing optical system is in said ready-to-photograph state, and wherein said component force imparting member comprises a projection which projects toward said object side.

7. The position controller according to claim 1, wherein said insertable/removable moving member is pivotally supported by said anti-shake moving member to be rotatable about a first rotational shaft that is parallel to said optical axis, and wherein said removal drive member is pivotally supported by said advancing/retracting member to be rotatable about a second rotational shaft that is parallel to said first rotational shaft.

8. The position controller according to claim 7, wherein said insertable/removable moving member comprises a pressing-force receiving part formed as an outer peripheral surface of a cylindrical projection, the axis of which extends parallel to said optical axis, wherein said removal drive member comprises a removal pressing portion formed as a flat surface extending in a radial direction of rotation of said removal drive member, and wherein, when said insertable/removable moving member is in said insertion position and said removal drive member is in said insertion allowance position, said pressing-force receiving part and said removal pressing portion are spaced away from each other while facing each other, and wherein said removal pressing portion comes into contact with said pressing-force receiving part when said removal drive member rotates from said insertion allowance position toward said forced removing position.

9. The position controller according to claim 8, wherein said insertion holder comprises:

a biasing member which biases and moves said insertable/removable moving member toward said insertion position; and a stopper provided on said anti-shake moving member, said insertable/removable moving member being brought into contact with said stopper by a biasing force of said biasing member to thereby determine said insertion position.

10. The position controller according to claim 1, wherein said position controller is incorporated in a camera having a retractable lens barrel.

11. The position controller according to claim 10, wherein said advancing/retracting member is guided linearly in said optical axis direction without rotating in said retractable lens barrel.

12. The position controller according to claim 2, wherein said anti-shake drive mechanism comprises an electromagnetic actuator.

* * * * *